(No Model.)
A. LIVELY.
FERTILIZER DISTRIBUTER.
No. 338,088. Patented Mar. 16, 1886.
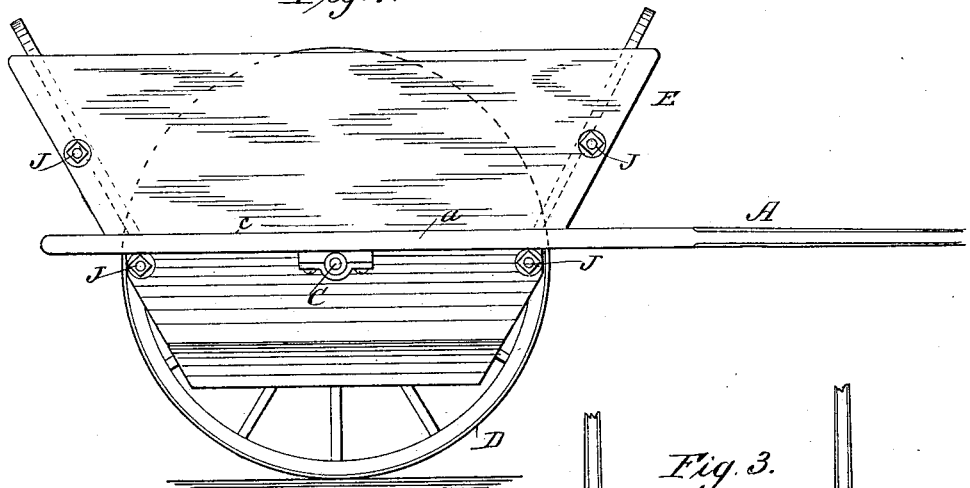
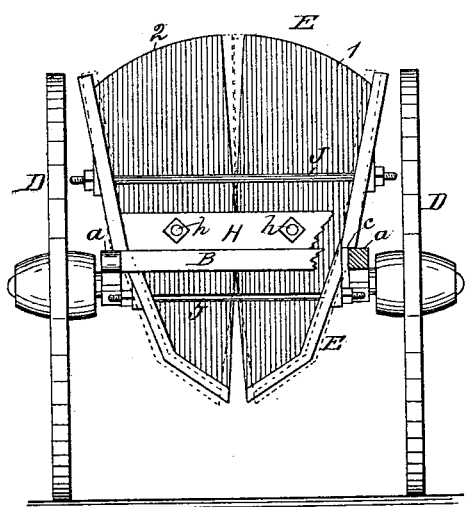
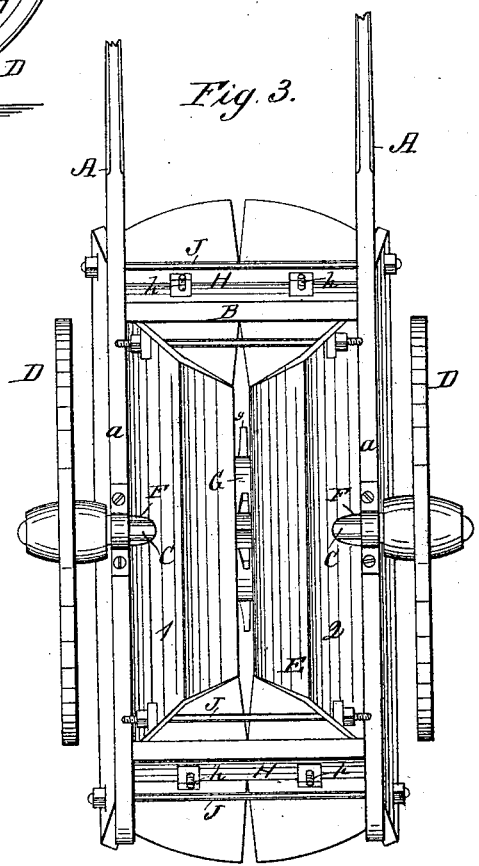
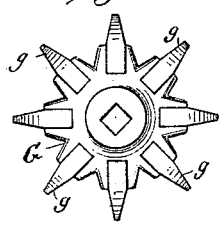
WITNESSES:
W. W. Hollingsworth
P. B. Turpin
INVENTOR:
Alex Lively
BY Munn & Co.
ATTORNEYS.

UNITED STATES PATENT OFFICE.

ALEXANDER LIVELY, OF SARDIS, GEORGIA.

FERTILIZER-DISTRIBUTER.

SPECIFICATION forming part of Letters Patent No. 338,088, dated March 16, 1886.

Application filed December 7, 1885. Serial No. 185,001. (No model.)

*To all whom it may concern:*

Be it known that I, ALEXANDER LIVELY, of Sardis, in the county of Burke and State of Georgia, have invented a new and useful Improvement in Fertilizer - Distributers, of which the following is a description.

My invention is an improvement in fertilizer-distributers; and it consists in certain novel constructions, combinations, and arrangements of parts, as will be hereinafter described and claimed.

In the drawings, Figure 1 is a side view, one of the drive-wheels being removed. Fig. 2 is a rear elevation of the machine, the adjustment of the box-sections being indicated in dotted lines, and the body-supporting frame being broken away at the sides. Fig. 3 is a bottom plan view of the machine, and Fig. 4 is a detail side view of the stirrer-wheel.

Each thill or shaft A is shown extended rearwardly at $a$, forming the side bars of a body-supporting frame, the end bars, B B, of which extend between the bars $a$. In this body-supporting frame I journal the agitator-shaft C, which, in the present instance, is revolved by fixing one or both of the supporting-wheels D D on its ends. The body E, which is fitted within the supporting-frame, may have its sides formed or provided with downwardly - facing shoulders $e$, which rest down upon the side bars, $a$, as shown most clearly in Fig. 2. Openings F are formed in the sides of the body for the passage of the agitator-shaft. These openings are elongated vertically to permit the adjustments of the body-sections, as will be described. This body E is divided on a central longitudinal line into two sections, 1 and 2, one or both of which are adjustable by a pivotal movement. This adjustment is preferably accomplished by a pivotal movement of both of the sections, as by such movement the lower inner edges, between which works the agitator-wheel F, are in each adjustment set equidistant from the agitator. This agitator is secured on the shaft C, and is provided with teeth G, secured and supported as will be more fully described hereinafter. The sections 1 and 2 are connected at their ends by bars or battens H, secured by bolts $h$ to the ends of the sections. The meeting edges of the ends of the sections are formed on lines diverging from a point midway their upper and lower sides, and the abutting edges are formed or diverge at approximately equal angles. Each section of the body may move on its bolts $h$ as pivots, said bolts being passed through batten-bars I, as shown; or said bolts might be passed through slots in the body, so that the sections might have their centers of pivotal motions at the points where their edges abut. In either instance the diverging edges of the ends of the sections permit the pivotal movements of the sections without leaving large openings at the ends of the sections. It will also be understood that where desired the box-ends may be provided with cover-plates secured to one section and lapping over its joint with the other; but the construction as shown is preferred. Clamp-rods J connect the sections above and below the batten-bars I, so the sections may be held in any desired adjustment. While I prefer these clamping-rods, manifestly the sections may be held by pawls or the like engaging a rack mounted on one of the batten-bars; or such rack might be mounted on the body-supporting frame. The adjustment of the sections increases or diminishes the space between their lower edges, so that a greater or less quantity of fertilizer is distributed by each revolution of the agitator-wheel, which operates between the lower edges of the sections. This agitator-wheel F is formed of a body or plate having radial recesses $f$ in one of its faces, and the teeth G are removably secured, usually by bolts, in said recesses. This furnishes a strong agitator, and when a tooth breaks it may be replaced at slight cost, as will be seen.

Having thus described my invention, what I claim as new is—

1. In a fertilizer-distributer, a box or body divided vertically into sections and having a pivotal adjustment, substantially as set forth.

2. In a fertilizer-distributer, a box or body divided vertically into sections, each of which is pivotally adjustable, substantially as set forth.

3. In a fertilizer-distributer, a box or body divided vertically into sections having a pivotal adjustment, the meeting edges of the ends of said sections being formed on lines diverging from a point midway the upper and lower sides thereof, substantially as set forth.

4. In a fertilizer-distributer, a box or body divided vertically into sections and having the ends of such sections connected by battens, said battens being pivotally connected to each of the sections, substantially as set forth.

5. The combination, in a fertilizer-distributer, of the body-sections, batten-bars connecting the ends thereof and pivoted to each section, and clamp-rods connecting the sections above and below the batten-bars, substantially as set forth.

6. In a fertilizer-distributer, the box or body herein described, consisting of the sections having the meeting edges of their ends formed on lines diverging from a point midway the upper and lower sides thereof, the batten-bars pivoted to and connecting the said sections, and the clamp-rods extending between said sections above and below the batten-bars, substantially as set forth.

ALEXANDER LIVELY.

Witnesses:
HENRY Q. BELL,
JOHN F. LAWSON.